(12) United States Patent
Cook

(10) Patent No.: US 10,509,299 B2
(45) Date of Patent: Dec. 17, 2019

(54) LIGHT SHIELDING DEVICE

(71) Applicant: Travis Cook, Cleveland, GA (US)

(72) Inventor: Travis Cook, Cleveland, GA (US)

( * ) Notice: Subject to any disclaimer, the term of this patent is extended or adjusted under 35 U.S.C. 154(b) by 0 days.

(21) Appl. No.: 15/450,408

(22) Filed: Mar. 6, 2017

(65) Prior Publication Data

US 2017/0255081 A1   Sep. 7, 2017

Related U.S. Application Data

(60) Provisional application No. 62/303,563, filed on Mar. 4, 2016.

(51) Int. Cl.
  *G03B 11/04* (2006.01)
  *A44B 11/25* (2006.01)

(52) U.S. Cl.
  CPC ............ *G03B 11/048* (2013.01); *A44B 11/25* (2013.01)

(58) Field of Classification Search
  CPC ........ G03B 11/048; G03B 11/04; A44B 11/25
  See application file for complete search history.

(56) References Cited

U.S. PATENT DOCUMENTS

| 4,297,747 A * | 11/1981 | Nava ...................... A42B 3/224 |
| | | 2/424 |
| 4,397,047 A * | 8/1983 | Nava ...................... A42B 3/222 |
| | | 2/424 |
| 4,469,195 A * | 9/1984 | Sartain ...................... E06C 7/48 |
| | | 182/107 |
| 4,726,074 A * | 2/1988 | Baclit ...................... A42B 1/247 |
| | | 2/10 |
| 4,839,924 A * | 6/1989 | Laurence ............... A42B 1/247 |
| | | 2/12 |
| 5,007,110 A * | 4/1991 | Gilbert ................... A42B 1/062 |
| | | 2/10 |
| 5,035,006 A * | 7/1991 | Hetz .................. A41D 13/1161 |
| | | 128/206.19 |
| 5,125,113 A * | 6/1992 | Yun ......................... A42B 1/205 |
| | | 2/10 |
| 5,128,548 A * | 7/1992 | Goodson ................... G01V 8/12 |
| | | 250/341.1 |
| 5,131,496 A * | 7/1992 | White ................... A01M 31/02 |
| | | 108/152 |
| 5,310,151 A * | 5/1994 | Engel ...................... F21V 21/08 |
| | | 248/219.4 |

(Continued)

*Primary Examiner* — William R Alexander
*Assistant Examiner* — Balram T Parbadia
(74) *Attorney, Agent, or Firm* — Global Intellectual Property Agency, LLC; Daniel Boudwin

(57) ABSTRACT

A device for shielding an outdoor camera from light interference. The light shielding device includes a visor having a brim perpendicularly and pivotally connected to a panel, wherein the panel can rest flush against a support and the brim extends over a camera in order to shield the camera lens from direct sunlight and inclement weather. A first strap extends from a first side of the panel and a second strap extending from a second side of the panel, wherein a distal end of each of the first and second strap removably secure to one another to form a loop. A male and female fastener are disposed at the distal ends of each strap and removably secure the device to the support. In some embodiments, a plurality of teeth extend from an interior side of the panel and can penetrate the support for further securing the device thereto.

12 Claims, 5 Drawing Sheets

(56) References Cited

U.S. PATENT DOCUMENTS

| | | | | |
|---|---|---|---|---|
| 5,351,923 | A * | 10/1994 | Booth, Jr. | F16M 13/02 |
| | | | | 211/107 |
| 5,613,246 | A * | 3/1997 | Alexander | A42B 1/064 |
| | | | | 2/10 |
| 5,842,541 | A * | 12/1998 | Arcuri | A01M 31/02 |
| | | | | 182/187 |
| 5,884,334 | A * | 3/1999 | Collette | A42B 1/065 |
| | | | | 2/10 |
| 6,021,984 | A * | 2/2000 | Mills | F16M 11/14 |
| | | | | 248/219.4 |
| 6,721,961 | B2 * | 4/2004 | Park | A42B 1/063 |
| | | | | 2/175.2 |
| 7,534,056 | B2 | 5/2009 | Cross et al. | |
| D628,614 | S | 12/2010 | Barley et al. | |
| 8,421,861 | B2 | 4/2013 | Barley et al. | |
| 9,126,723 | B2 * | 9/2015 | Messerschmidt | B65D 25/22 |
| 2002/0159770 | A1 | 10/2002 | Moultrie, Jr. | |
| 2006/0197001 | A1 * | 9/2006 | Parker | F16M 11/10 |
| | | | | 248/230.8 |
| 2010/0208068 | A1 | 8/2010 | Elsemore | |
| 2011/0023204 | A1 * | 2/2011 | Brace | A42B 3/225 |
| | | | | 2/8.2 |
| 2011/0194184 | A1 * | 8/2011 | Barton | G03B 11/04 |
| | | | | 359/601 |
| 2011/0308887 | A1 * | 12/2011 | Johnson | A01M 31/02 |
| | | | | 182/187 |
| 2015/0040292 | A1 * | 2/2015 | Koh | A42B 1/064 |
| | | | | 2/195.7 |
| 2016/0234952 | A1 * | 8/2016 | Lozano, IV | H04N 5/2251 |

\* cited by examiner

LIGHT SHIELDING DEVICE

CROSS REFERENCE TO RELATED APPLICATION

This application claims the benefit of U.S. Provisional Application No. 62/303,563 filed on Mar. 4, 2016. The above identified patent application is herein incorporated by reference in its entirety to provide continuity of disclosure.

BACKGROUND OF THE INVENTION

The present invention relates to shields for blocking light. More specifically, the present invention provides a light shielding device adapted to be secured to a support and positioned above an outdoor camera.

Many hunters and nature enthusiasts set up cameras in specific areas in order to scout or observe the type of wildlife that gathers or passes through that area. However, cameras left outdoors can become damaged without proper protection due to animal interference, inclement weather, among other factors. Further, without proper protection, moisture can corrode the operating components of the camera, causing the camera to permanently malfunction. Additionally, the camera may take poor quality pictures if sunlight beams directly into the lens.

Devices have been disclosed in the known art that relate to light shielding devices. These devices generally relate to hats having a brim. However, these devices have several known drawbacks. These devices fail to provide mating fasteners removably securable to one another that allows each side of the strap to adjust in length. Further, these devices fail to provide a plurality of teeth extending towards the interior thereof.

In light of the devices disclosed in the known art, it is submitted that the present invention substantially diverges in design elements from the prior art and consequently it is clear that there is a need in the art for an improvement to existing light shielding devices. In this regard the instant invention substantially fulfills these needs.

SUMMARY OF THE INVENTION

In view of the foregoing disadvantages inherent in the known types of light shielding devices now present in the prior art, the present invention provides a new light shielding device wherein the same can be utilized for providing convenience for the user when shielding a camera lens from direct sunlight and inclement weather.

It is therefore an object of the present invention to provide a new and improved light shielding device that has all of the advantages of the prior art and none of the disadvantages. The light shielding device comprises a visor having a brim perpendicularly and pivotally connected to a panel, wherein the panel is adapted to rest flush against a support. The brim is configured to extend over a camera in order to shield the camera lens from direct sunlight and inclement weather. A first strap extends from a first side of the panel and a second strap extending from a second side of the panel, wherein a distal end of each of the first and second strap removably secure to one another to form a loop. A male and female fastener are disposed at the distal ends of each strap and removably secure the device to the support. In some embodiments, a plurality of teeth extend from an interior side of the panel and can penetrate the support for further securing the device thereto.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
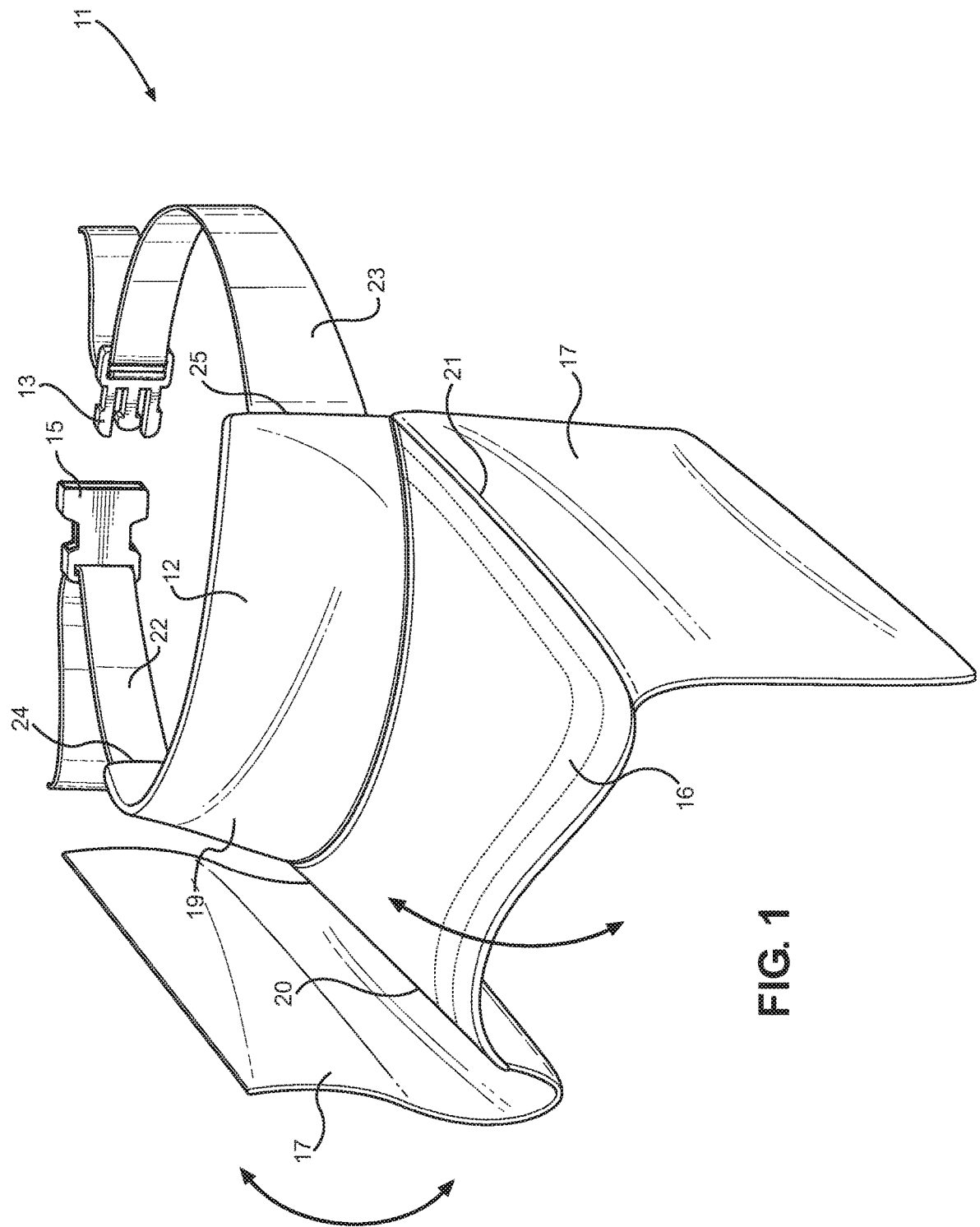
FIG. 1 shows a perspective view of an embodiment of the light shielding device.

Reference is made herein to the attached drawings. Like reference numerals are used throughout the drawings to depict like or similar elements of the light shielding device. For the purposes of presenting a brief and clear description of the present invention, the preferred embodiment will be discussed as used for shielding a camera lens from direct sunlight and inclement weather. The figures are intended for representative purposes only and should not be considered to be limiting in any respect.

Referring now to FIG. 1, there is shown a perspective view of an embodiment of the light shielding device. The light shielding device 11 comprises a visor 12 having a brim 16 perpendicularly extending from a panel 19. The panel 19 is adapted to rest flush against a support, such as a tree. In the illustrated embodiment, the panel 19 comprises a substantially rectangular shape. However, in alternate embodiments, the panel 19 comprises any suitable shape that is adapted to rest flush against a surface. The length of the panel 19 comprises the same length or greater than the length of the brim 16. In this way, the panel 19 supports the brim 16 when the device 11 is secured to a support. In the illustrated embodiment, the panel 19 is composed of a flexible material in order to allow the panel 19 to bend so as to rest flush on a curved surface.

A first strap 22 extends from a first side 24 of the panel 19 and a second strap 23 extends from an opposing second side 25 of the panel 19, wherein a distal end of each of the first and second strap 22, 23 removably secure to one another to form a loop. In the illustrated embodiment, a pair of mating fasteners 13, 15 are disposed at the distal ends of the strap 22, 23 in order to removably secure the device 11 to the support. The first strap 22 comprises a female fastener 15 removably securable to a male fastener 13 disposed on the second strap 23. The straps 22, 23 are threaded through the fasteners, wherein each strap 22, 23 is adjustable in length in order to allow the device 11 to secure to supports of various sizes. When fastened, the straps 22, 23 form a continuous loop configured to wrap around a support, such as a tree or pole. The visor 12 and straps 22, 23 are composed of a water resistant material in order to prevent degradation of the device 11 when used outdoors. In some embodiments, a layer composed of water resistant material is disposed over the exterior surface of the visor 12 and straps 22, 23.

The brim 16 is pivotally secured to the panel 19, wherein the brim 16 is configured to retain its position when pivoted along the panel 19. The brim 16 is adapted to extend over a camera, and in close proximity thereto, in order to shield the camera lens from direct sunlight and inclement weather. In some embodiments, a detent hinge secures the panel 19 to the brim 16 so as to allow the brim 16 to retain its pivoted position. The brim 16 is pivotable so as to allow the user to adjust the angle required by the brim 16 to protect the camera lens from sunlight.

The brim 16 comprises a substantially rectangular shape, however, in alternate embodiments, the shape of the brim 16 is configured to extend over a camera disposed therebelow. In the illustrated embodiment, the brim 16 is curved from a first lateral side 20 to a second lateral side 21 thereof. The peak of the curve is positioned an equal distance between the first and second lateral sides 20, 21. This allows the brim 16 to block sunlight or rain from traveling downwards from different angles and interfering with a camera lens positioned therebelow.

In the illustrated embodiments, a pair of side shields 17 extend downwards from the opposing lateral sides 20, 21 of the brim 16 of the visor 12. The side shields 17 are configured to extend the length of the camera and protect the lateral sides thereof from rain, debris, and the like. In the illustrated embodiment, the side shields 17 are rectangular in shape and composed of flexible material so as to allow the side shields 17 to fold upwards over the brim 16 when required to protect the sides of the camera. The side shields 17 are pivotally secured to the brim 16.

Figure 2:
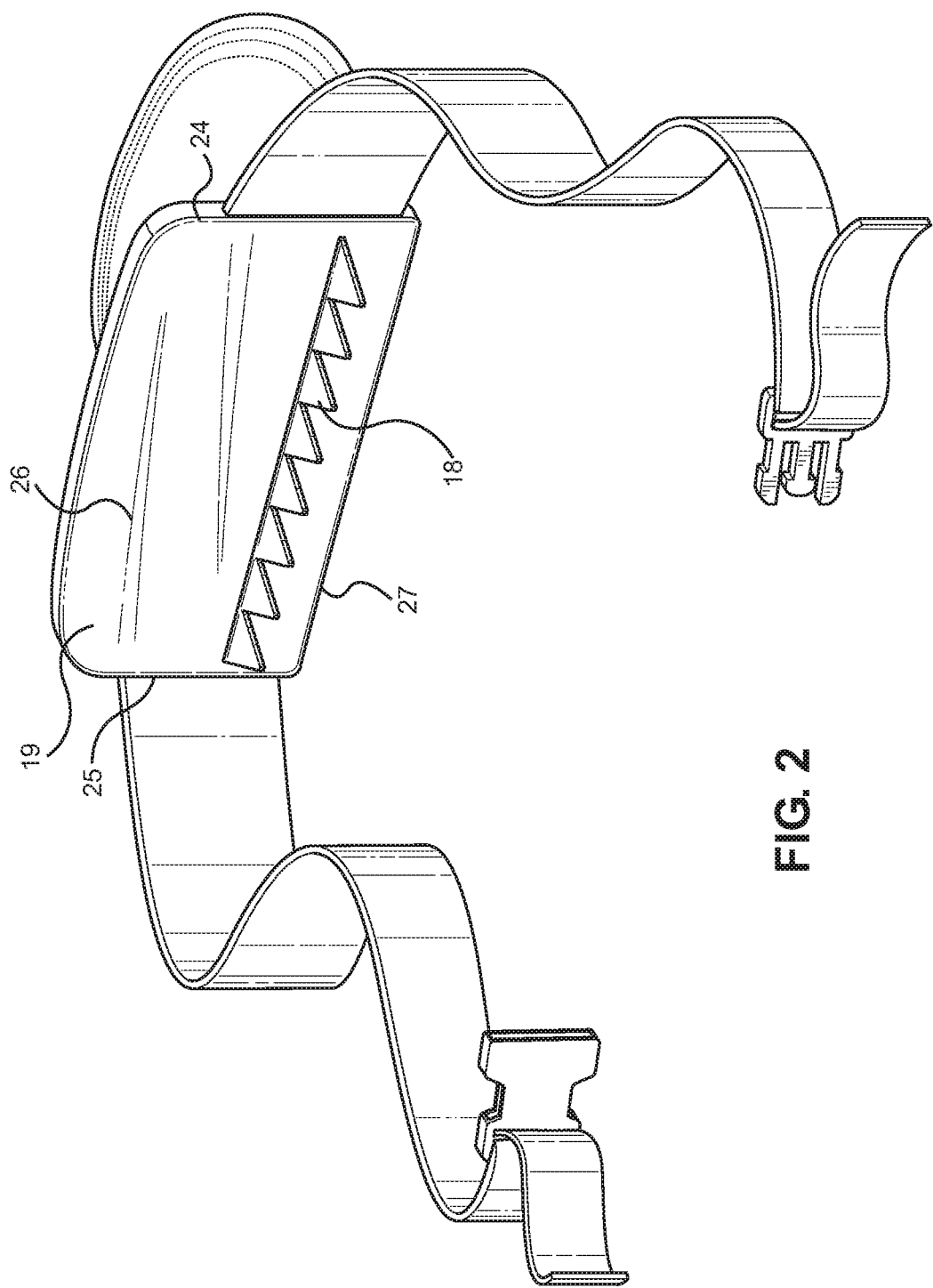
FIG. 2 shows a perspective view of the teeth disposed on the interior side of the panel of the light shielding device.

Referring now to FIG. 2, there is shown a perspective view of the teeth disposed on the interior side of the panel of the light shielding device. In some embodiments, the interior side 26 of the panel 19 comprises an attachment mechanism adapted to further secure the light shielding device 11 to a support. In the illustrated embodiment, the attachment mechanism comprises one or more teeth 18 extending from an interior side 26 of the panel 19. The teeth 18 are configured to penetrate a support for further securing the device 11 thereto. In the illustrated embodiment, the teeth 18 are coextensive with one another and are aligned horizontally, wherein the teeth 18 are parallel to the lower end 27 of the panel 19.

Figure 3:
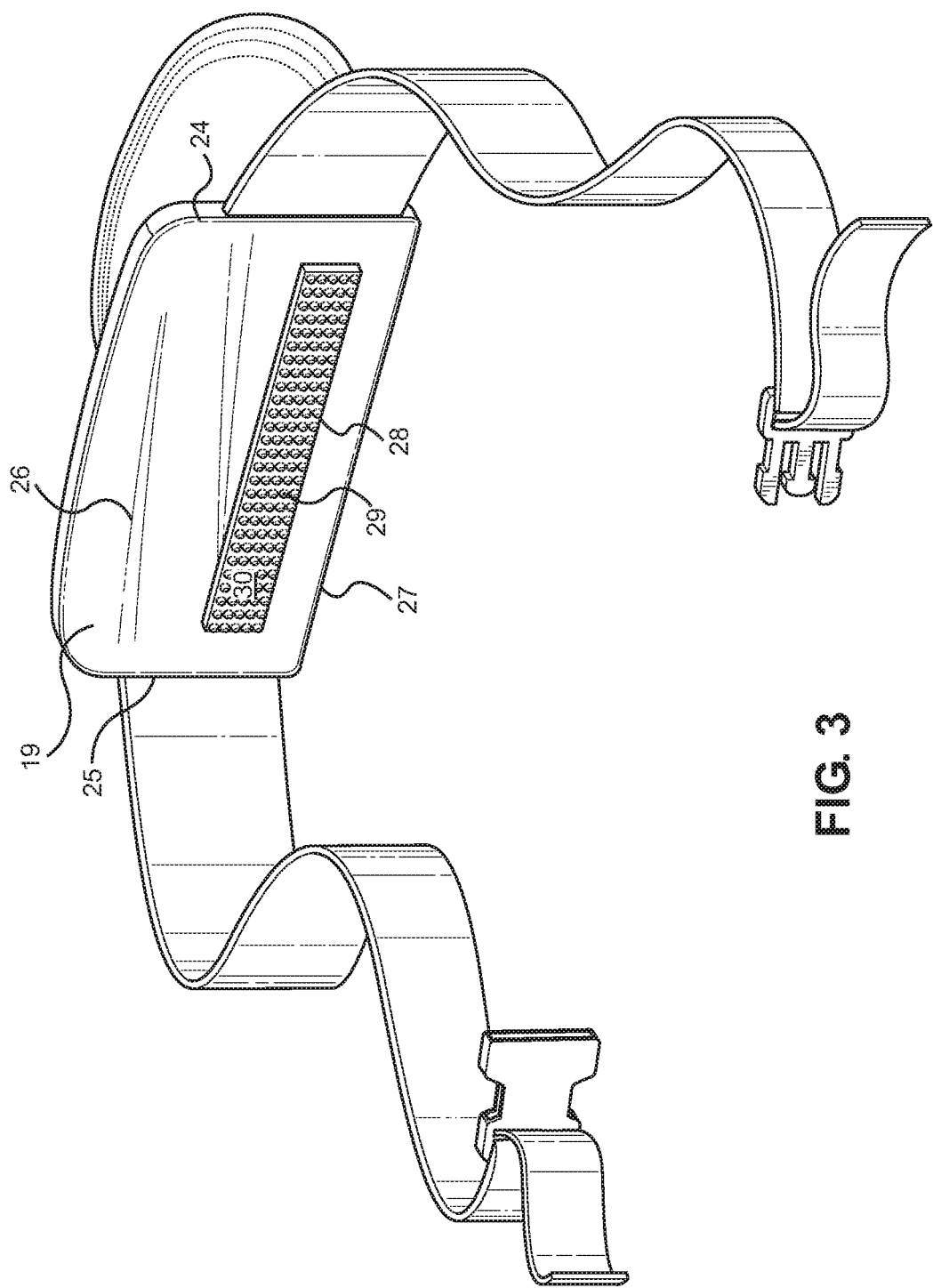
FIG. 3 shows a perspective view of the elongated grip disposed on the interior side of the panel of the light shielding device.

Referring now to FIG. 3, there is shown a perspective view of the elongated grip disposed on the interior side of the panel of the light shielding device. In alternate embodiments, the attachment mechanism comprises an elongated grip 28 extending between the first and second lateral sides 24, 25 of the panel 19. The grip 28 comprises a rectangular shape and is composed of material configured to prevent the interior side 26 of the panel 19 from sliding down a vertical support when attached thereto. In the illustrated embodiment, the surface 30 of the grip 28 comprises a plurality of protrusions 29 configured to add friction to a surface when positioned thereagainst. The protrusions are dispersed across the exterior surface 30 of the grip 28.

Figure 4:
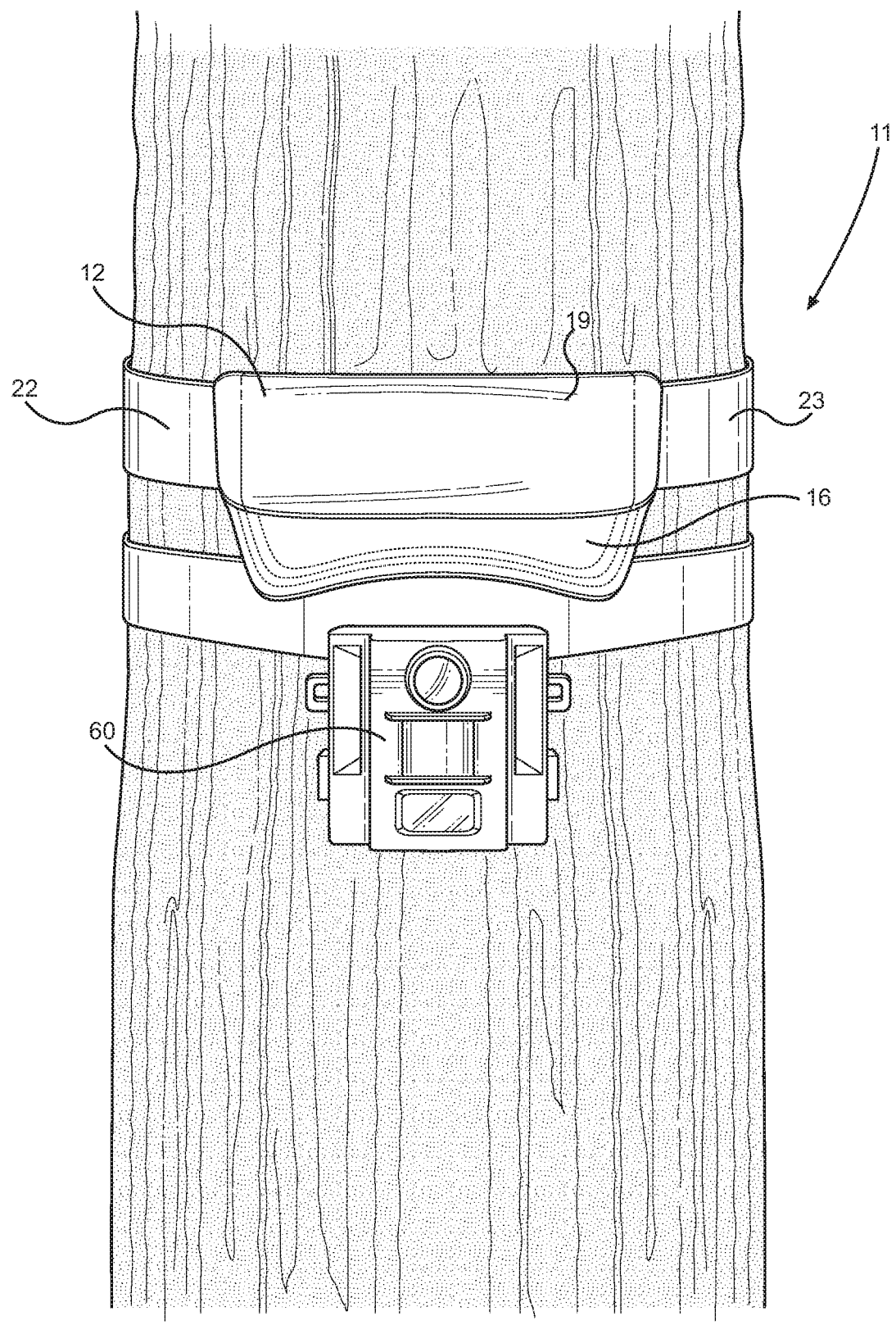
FIG. 4 shows a perspective view of the light shielding device secured to a tree.
Figure 5:
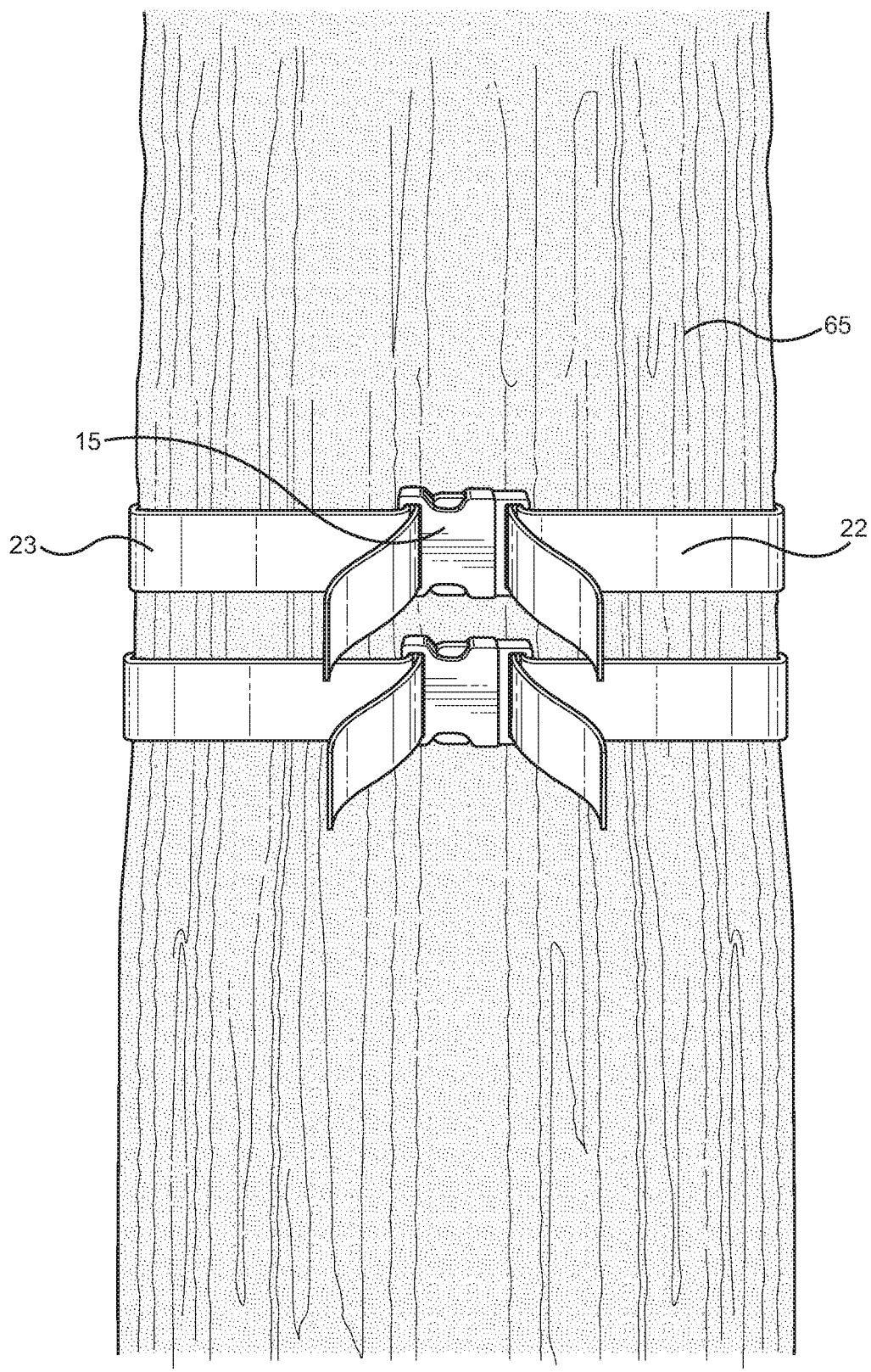
FIG. 5 shows a perspective view of the fasteners of the light shielding device secured to a tree.

Referring now to FIGS. 3 and 4, there is shown a perspective view of the light shielding device secured to a tree and a perspective view of the fasteners of the light shielding device secured to a tree, respectively. In operation, the visor 12 of the light shielding device is positioned above a camera 60 that has been secured to a vertical support, such as a tree 65. The teeth extending from the panel 19 penetrate the tree 65 so as to allow the panel 19 to rest flush against the tree 65 and secure the device 11 thereto. In an alternate use, only the distal ends of the teeth penetrate the tree 65 to serve as a grip for preventing the device 11 from sliding down along the tree 65. The brim 16 of the visor 12 extends over the camera 60 so that the lens of the camera 60 is shielded from direct sunlight or rain. The straps 22, 23 of the device 11 are wrapped around the tree 65 so as to form a loop. The distal ends of the straps 22, 23 are secured to one another via the mating fasteners 15. The ends of the straps 22, 23 can be pulled through the fasteners 15 in order to adjust the length of the loop so the straps 22, 23 are tightened around the tree 65.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A light shielding device, consisting of:
   a visor including a brim perpendicularly connected to an exterior side of a panel;
   a first strap extending from a first side of the panel and a second strap extending from a second side of the panel defining an interior side configured to receive a cylindrical support therethrough, wherein a distal end of each of the first and second strap removably secure to one another to form a loop;
   an attachment mechanism extending from the interior side of the panel, wherein the attachment mechanism is configured to secure to the support;
   further comprising a pair of side shields each disposed on opposing lateral sides of the visor;
   wherein the pair of side shields are made of a flexible material;
   wherein the attachment mechanism comprises a singular row of teeth extending from a bottom portion of the interior side of the panel;
   the row of teeth configured to engage and support the visor thereto.

2. The light shielding device of claim 1, wherein the row of teeth are each coextensive with one another.

3. The light shielding device of claim 1, wherein the pair of side shields are pivotally secured to the visor.

4. The light shielding device of claim 1, wherein the brim is pivotally secured to the panel such that the brim is configured to maintain a position when pivoted.

5. The light shielding device of claim 1, wherein the panel consists of a flexible material configured to allow the panel to bend so as to rest flush on a curved surface.

6. The light shielding device of claim 1, wherein the attachment mechanism comprises an elongated grip comprising a plurality of protrusions along a surface thereof, the elongated grip configured to engage a support and secure the visor thereto.

7. The light shielding device of claim 1, wherein the attachment mechanism is configured to penetrate a tree.

8. The light shielding device of claim 1, wherein the interior side of the panel rests flush against the support when the attachment mechanism is secured thereto.

9. The light shielding device of claim 1, wherein a length of the panel is greater than a length of the brim.

10. The light shielding device of claim 1, wherein a length of the panel is equal to a length of the brim.

11. The light shielding device of claim 1, wherein the visor and the first strap and the second strap are made of a water resistant material.

12. The light shielding device of claim 1, wherein the brim is curved from a first lateral side to a second lateral side, such that a peak is defined at an equal distance therebetween.

* * * * *